United States Patent [19]

Miyawaki et al.

[11] Patent Number: 4,811,060
[45] Date of Patent: Mar. 7, 1989

[54] OPTICAL SYSTEM SHIFTING DEVICE FOR A CAMERA

[75] Inventors: Makoto Miyawaki, Kanagawa; Yukio Ogawa, Tokyo; Takanori Kodaira, Kanagawa; Michio Hirohata, Tokyo, all of Japan

[73] Assignee: Canon Kabushiki Kaisha, Tokyo, Japan

[21] Appl. No.: 697,283

[22] Filed: Feb. 1, 1985

[30] Foreign Application Priority Data

Feb. 4, 1984 [JP] Japan .................................. 59-17652
Feb. 4, 1984 [JP] Japan .................................. 59-17653
Feb. 4, 1984 [JP] Japan .................................. 59-17654
Feb. 4, 1984 [JP] Japan .................................. 59-17655

[51] Int. Cl.⁴ .......................... G02B 7/02; G03B 1/18
[52] U.S. Cl. ................................. 350/255; 354/195.1
[58] Field of Search ............... 350/252, 255, 429, 430; 354/195.1, 173.1

[56] References Cited

U.S. PATENT DOCUMENTS

| | | | |
|---|---|---|---|
| 3,841,735 | 10/1974 | Katagiri et al. | 350/430 |
| 4,258,998 | 3/1981 | Lermann et al. | 354/173.1 |
| 4,555,165 | 11/1985 | Negoro | 350/429 |
| 4,583,827 | 4/1986 | Tokunaga et al. | 350/429 |
| 4,601,563 | 7/1986 | Miyawaki et al. | 354/195.1 |

Primary Examiner—John K. Corbin
Assistant Examiner—Loha Ben
Attorney, Agent, or Firm—Toren, McGeady & Associates

[57] ABSTRACT

An optical system shifting device for a camera in which an optical system is shifted in the direction of the optical axis by the driving force of a motor, wherein a first positioning member effects the positioning of the optical system in the direction of the optical axis independently of the driving force of the motor, a second positioning member effects the positioning of the optical system in a direction perpendicular to the optical axis of the optical system, and a switching member actuates the motor by giving an external force to the optical system, whereby the functional features as well as maneuverability of the optical system shifting device are improved.

45 Claims, 6 Drawing Sheets

OPTICAL SYSTEM SHIFTING DEVICE FOR A CAMERA

BACKGROUND OF THE INVENTION

1. Field of the Invention

The present invention relates to an optical system shifting device for a camera in which an optical system, such as a photo-taking lens, etc., is shifted in the direction of the optical axis for varying the focal distance, etc.

2. Description of the Prior Art

Various types of optical system shifting devices for a camera have been proposed heretofore. These include a photo-taking lens which can be housed within the camera body for assuring compactness in size of the camera so as to facilitate its handling, or an optical system, such as a photo-taking lens, etc., which is made to be freely movable in the direction of the optical axis for varying the focal distance. The movement of the optical system is capable of being effected automatically by the driving force of a motor.

FIG. 1 shows an example of this kind of optical system shifting device, wherein, when a changeover lever 1 is rotated manually in the clockwise direction, a gear 4 and a tele-wide gear 5 engage with each other, and, at the same time, a switch 7, which is to rotate a motor 6 in the reverse direction, is placed in the ON state. As a result of this, the driving force of the motor 6 is transmitted through a gear train shown in the drawing and a gear 3 and a gear 4 of the changeover lever 1 to the tele-wide gear 5. Then, a rotating pin 9, within an elongated hole 8a of an arm 8, which rotates in the direction of an arrow shown in the drawing along with a rotation of the tele-wide gear 5, shifts and retreats the arm 8 together with a lens barrel 10 in the direction of the optical axis as shown by an arrow in the drawing. Meanwhile, a roller 1 comes out of a tele-cam 8b of the arm 8 and rides over a cam part 8c. The state will be maintained. After that, when the rotating pin 9 reaches the rearmost position, the roller 11 drops into a wide-cam 8d, thereby rotating the changeover lever 1 in the counterclockwise direction by the action of a spring 2. The engagement between the gear 4 and the tele-wide gear 5 is discontinued while, at the same time, the switch 7 is placed in an OFF state and rotation of the motor 6 stops so that positioning of the lens barrel 10 which holds a lens 10a may be carried out.

Also, while an explanation is provided on the pulling-in of the lens barrel 10 in the above description, at the time of pulling-out, as the rotating pin 9 rotates from the rearmost position to the foremost position, the pulling-out and positioning of the lens barrel 10 will be made in a manner similar to that which is mentioned above.

However, in this kind of optical system shifting device, the positioning of the lens barrel 10 to a prescribed position depends, as shown in FIG. 1, on the changeover timing of a clutch consisting of the changeover lever 1, etc., and on the timing of the ON-OFF positioning of the switch 7 for driving the motor 6. Therefore, precision in the setup of such components has to be maintained at a high level, thus increasing difficulty in manufacture. Also, as the rotating pin 9 and a sliding part of the elongated hole 8a serve concurrently for driving and positioning of the lens barrel 10, problems with regard to the components being placed in an engaged state when shifting of the lens barrel 10 stops, thus impairs the smooth movement thereof at the time when the lens barrel 10 starts shifting again.

Further, when the lens barrel 10 is pulled forward by an external force, as shown in FIG. 1, such a force, preventing counterclockwise rotation in the direction shown by the arrow in the drawing, will be imparted to the tele-wide gear 5 through the elongated hole 8a and the rotating pin 9, and, as a result of this, the gear 4, which tends to rotate the gear 5 in the counterclockwise direction, rotates the changeover lever 1 by an increase in the reaction force thereof in the counterclockwise direction which is the direction shown by the arrow in the drawing. Therefore, the roller 11 provided at the changeover lever 1 will push strongly on a side of the arm 8.

Therefore, when an external force, such as may be applied by the hand of an operator, acts inadvertently on the lens barrel at the time when the lens barrel is pulled in, a strong force will act in a direction other than the direction of the optical axis of the lens, thus creating the problem of eccentricity and imparting an inclination to the lens.

Also, even if the gear 4 rotates in the counterclockwise direction, contrary to the above-mentioned case, when the lens barrel 10 is pushed in by an external force at the time of pulling-in of the lens barrel, the tele-wide gear 5 tends to rotate further in the clockwise direction, thus increasing the counterclockwise rotation of the gear 4. Therefore, the rotating force of the changeover lever 1 in the direction of the arrow shown in the drawing increases, and, in this case, the roller 11 also strongly pushes on a side of the arm 8.

Also, as in the case of pulling-out the lens barrel 10 which is considered to be on the same level, the side of the arm 8 will be pushed strongly by the roller 11 depending on the direction of the external force that is working on the lens barrel 10.

Also, the kinds of optical system shifting devices mentioned above have problems such that an operator has to operate an actuating switch, thus taking his or her eyes off the viewfinder depending upon the position of the actuating switch. This constitutes troublesome handling of the camera, and, at the same time, when a shock through an external force works on the lens barrel as the shifting stops, the shock also affects the driving system thereof, which could cause damage to the optical system of the lens barrel, and, therefore, to the driving system.

Therefore, the lens barrel or a driving mechanism could be reinforced so as to withstand such shocks, but it would involve having a more complicated mechanism as well as increasing the weight and/or size.

SUMMARY OF THE INVENTION

An object of the present invention lies in the elimination of shortcomings in the conventional device and in an improvement of the functional features and maneuverability of an optical system shifting device for shifting an optical system by a driving force of a motor in the direction of the optical axis. Accordingly, the invention provides a first positioning member for positioning the optical system in the direction of the optical axis independently of the driving force of the motor, a second positioning member for positioning the optical system in a direction perpendicular to the directin of the optical axis of the optical system, and switching means for activating the motor by adding an extenal force to the optical system.

Other objects of the present invention will become apparent from the following description of the preferred embodiments thereof.

BRIEF DESCRIPTION OF THE DRAWINGS

FIGS. 10(a) and 10(b) are external oblique views of the camera as shown in FIG. 6, wherein FIG. 10(a) shows a state in which the lens barrel is set at the telephoto side, while FIG. 10(b) shows a state in which the lens barrel is set at the standard photo-taking side.

DETAILED DESCRIPTION OF THE PREFERRED EMBODIMENTS

Figure 2:
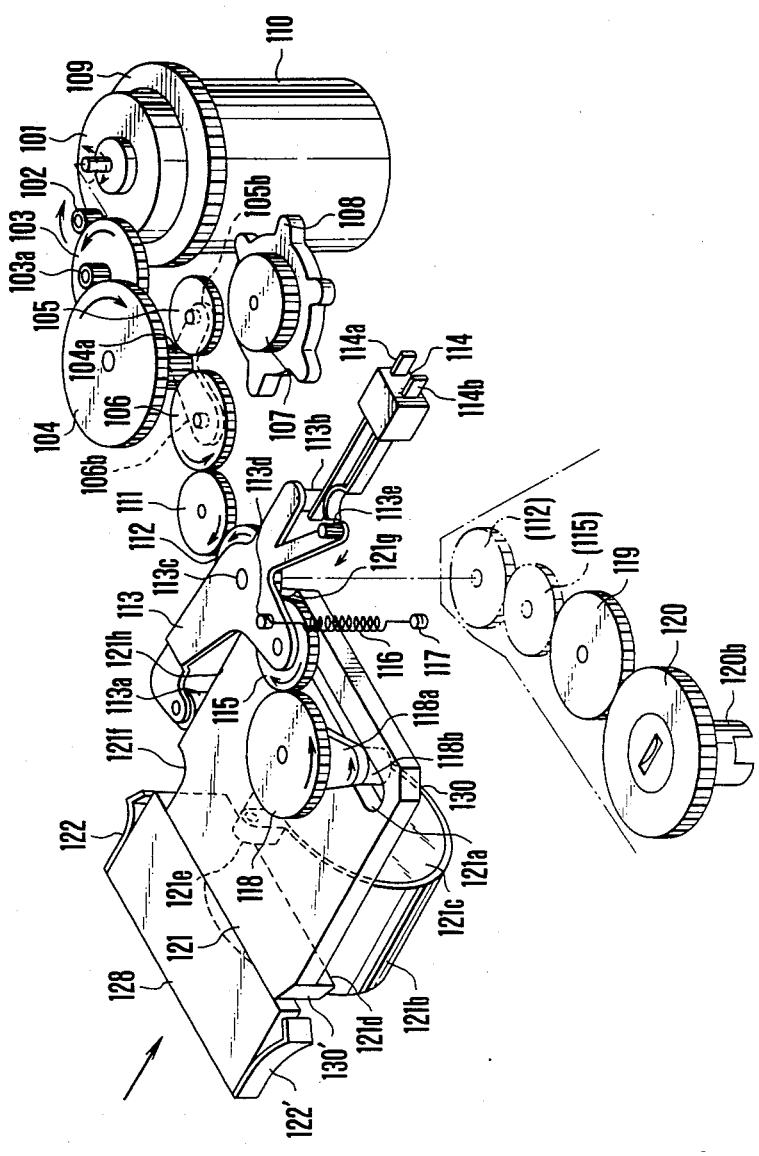
FIG. 2 is an oblique view showing an arrangement of a first embodiment of an optical system shifting device for a camera according to the present invention.

Referring now to the drawings, FIG. 2 is an oblique view showing an arrangement of an optical system shifting device according to a first embodiment of the present invention, wherein a reversible motor 101 effects the winding and rewinding of film, various charging operations, such as a shutter charge and the pulling-out and pulling-in of a lens barrel, and is housed in a spool 110 which rotates at the time of a film windup operation for taking up the film. A pinion gear 102 is pressure inserted into a shaft of the motor 101, and gears 103, 103a, 104, 104a form a gear train to reduce the speed of rotation of the motor 101, wherein the gears 103 and 103a are provided integrally in a concentric manner, as are the gears 104 and 104a, and the pinion gear 102 and the gear 103 mesh with each other while the gear 103a and the gear 104 mesh with each other. A spool clutch gear 105 transmits by the rotation of its spool clutch 105b the rotation of the gear 104a to a spool gear 109 attached to a spool 110 only at the time when the motor 101 rotates in the windup direction (at the time when the motor 101 rotates in the conterclockwise direction as shown by an arrow drawn by a dotted line in the drawing as a normal rotation of the motor). A windup clutch gear 106 rotates together with the rotation of its windup clutch 106b and engages either with a sprocket gear 107 at a time when the direction of rotation of the motor 101 is in the windup direction or with an idler gear 111 at the time when the rotating direction of the motor 101 is in a rewinding direction (at the time when the motor 101 rotates in the clockwise direction as shown by the arrow drawn by a solid line in the drawing as a reverse rotation of the motor 101), thus transmitting the rotation of the gear 104a.

Also, while the spool clutch gear 105 and the windup clutch gear 106 are always meshing with the gear 104a, the rotating shafts are provided respectively for the spool clutch 105b and the windup clutch 106b so that they can rotate independently, and further, some friction exists between both clutches 105b, 106b and both gears 105, 106, respectively, for making a changeover of the clutches.

A changeover lever 113 arranged concentrically with a shaft 113c of a gear 112 is biased in the counterclockwise direction by a spring 116 which spans between a pin 113d provided thereon and a pin 117 provided on the camera body side, wherein the changeover lever 113 is rotated manually, in the clockwise direction, etc., resisting the biasing force of the spring 116, thereby removing one gear 115 out of a gear train, 111→113→115→119→120 which is normally connected up to the fork 120b for the purpose of having the gear 115 engage with a tele-wide gear 118, for transmission of the rotation of the motor 101 to the tele-wide gear 118. Also, with the exception of a switch member 113e which is provided at the changeover lever 113 for the purpose of manually changing over a clutch consisting of the changeover lever 113, etc., and is exposed outside through an opening in the camera body, the changeover lever 113 is formed in the general shape of the letter T, wherein a gear 112 which meshes with the idler gear 111 is axially supported at the central portion of the lever 113, and a gear 115, which meshes with the gear 112, is axially supported at one end thereof, while a switch engaging part 113b is provided at the other end of the same. Further, a roller 113a is provided at still another end of the same. The tele-wise gear 18 changes its rotation into the rotation of a rotating pin 118b through a pin supporting part 118a, and the rotating pin 118b pushes the front wall or the rear wall of an elongated hole 121a of an arm 121 for moving the arm 121 forward or rearward relative to the camera, wherein a lens barrel supporting part 121e of a lens barrel 121b is attached to a lens barrel attaching part 121d of the arm 121, and the lens barrel 121b which holds a photo-taking lens 121c also moves forward and rearward. Also provided in the front of the arm 121, and attached thereto, is a lens barrel cover 128 having positioning sheet springs 122, 122' provided at the sides thereof. When the changeover lever 113 is rotated clockwise until the gear 115 meshes with the tele-wide gear 118, the switch engaging part 113b places a switch 114 in the ON state, while the switch 114 is placed in the OFF state unless the gears 115 and 118 mesh. Also, the switch 114 has a switch piece 114a and a switch piece 114b and these switch 114a and 114b are in contact with each other, and are placed in the ON state to supply power to the motor 101 in the reversed rotating direction, which is the clockwise direction. When the motor 101 rotates in the reversed direction and the above-mentioned gear train rotates and the arm 121 starts moving either forward or rearward, the roller 113a comes out of either a wide cam 121f or a tele-cam 121g provided at two corners of the arm 121 in a notched state and rides over a cam 121h which is provided in a direction parallel to the direction of the optical axis of the photo-taking lens 121c for preventing the changeover lever 113 from rotating in the counterclockwise direction, which returns the lever 113 by the function of a spring 116, while, at the same time, retaining the changeover lever 113 in the above-mentioned state so that movement of the arm 121 forward or rearward will not be hindered. When the lens barrel 121b reaches the pullout position which constitutes the photo-taking position (or a pull-in position), the spring 116 rotates the changeover lever 113 in the counterclockwise direction for dropping the roller 113a quickly into the tele-cam 121g (or the wide cam 121f). As a result of this, the gear 115 comes off of the tele-wide gear 118, and further, the switch 114 is placed in the OFF state. Also, there is an arrangement such that, since the reverse rotation of the motor 101 in the clockwise direction is transmitted through the gear train, 111→112→115→119→120, which is always in an engaged state except where the changeover lever 113 is changed over to the lens barrel side, the gear train rotates by the reverse rotation of the motor 101 at the time of rewinding and a fork 120b provided at the gear 120 rotates. Thus, film which has been exposed will be taken up into a patrone (not shown in the drawing) from the spool 110.

Figure 3:
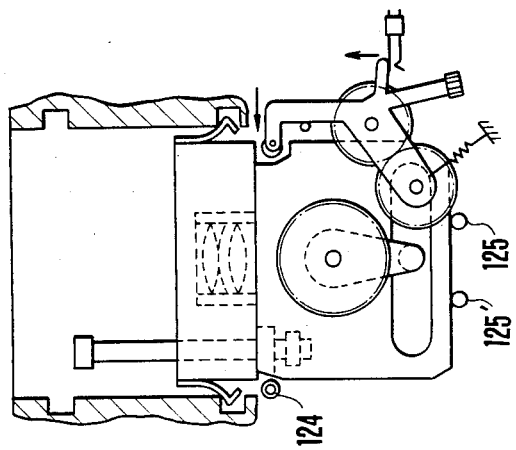
FIG. 3 is a partialoly cut view as seen from above the device shown in FIG. 2, while in a state in which a lens barrel is set at the telephoto side.
Figure 4:
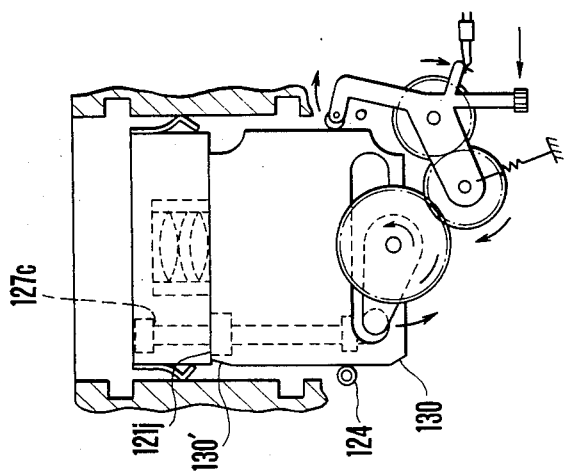
FIG. 4 is a partially cut view as seen from above the device shown in FIG. 2 during a state in which the lens barrel is set at the standard photo-taking side.
Figure 5:
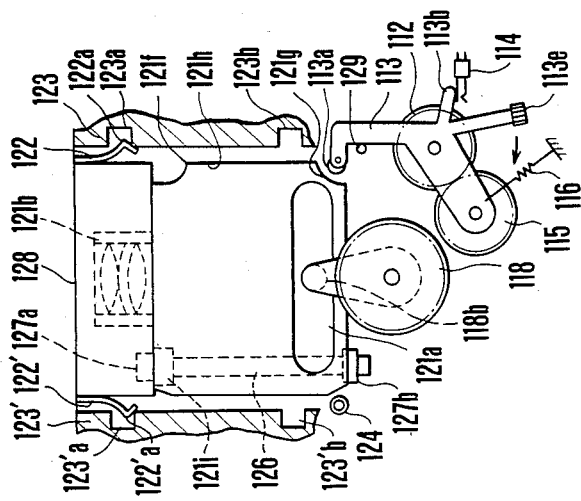
FIG. 5 is a partially cut view as seen from above the device shown in FIG. 2, while in a state in which the lens barrel is set at the standard photo-taking side.

FIGS. 3 to 5 are views of a lens barrel part as seen from above, wherein FIG. 3 shows the lens set at the tele-photo side, and FIG. 4 shows the lens barrel being pulled into the standard photo-taking side, while FIG. 5 shows the photo-taking lens set at the standard photo-taking side. Since the elements with the same identification numerals as in FIG. 2 have been explained, a detailed explanation thereof will be omitted here.

Figure 1:
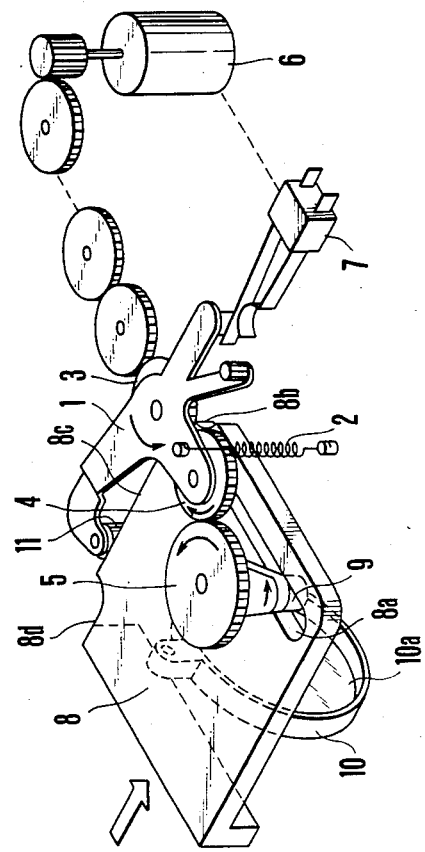
FIG. 1 is an oblique view showing an example of a conventional optical system shifting device for a camera.

In these drawings, an external tube 123, not shown in FIG. 1, is fixed to the camera body and sheet spring engaging holes 123a, 123'a as well as 123b, 123'b into which the sheet springs 122, 122' enter for positioning the lens barrel 121b, are provided at positions of the external tube corresponding to the prescribed positions for a standard photo-taking and a telephoto-taking of the lens barrel 121b. A plurality of sheet springs 122, 122' are attached to the outside of the lens barrel cover 128 attached to the front end of the arm 121 and extend in a direction biased toward the diametric direction of the external tube 123. Also engaging parts 122a, 122'a at the fore end portions thereof are formed generally in a V-shape, and shift the arm 121 and the lens barrel 121b independently of the rotating force of the rotating pin 118b from position just before their respective predetermined positions to the predetermined positions, when the sheet springs 122, 122' engage with the sheet spring engaging holes 123a, 123'a or 123b, 123'b of the external tube 123, thus positioning the same. A pin or smoothly rotating guide roller 124 is placed at a position which opposes the roller 113a sandwiching the arm 121 therebetween and has its external circumference formed into a sliding plane, and is fixed with the same diameter as that of the roller 113a. Also, the pin or roller 124 comes into contact with a side plane of the arm 121 for preventing unnecessary movement of the arm 121 in a direction perpendicular to the shifting direction thereof without hindering the shifting of the lens barrel 121b in the axial direction. A guide bar 126 has both of its ends supported by support stands 172a, 127b provided at the camera body and is provided in a direction parallel to the shifting direction of the arm 121 having a smooth external circumfence, and a circular bar retaining part 121i is fixed to the arm 121 and has the bar 126 inserted therethrough in a manner which is freely slidable in the axial direction. 125, 125' are stoppers for defining the positions of the lens barrel 121b and the arm 121 into which they are pulled to their limits and the sheet springs 122, 122' engage the sheet spring engaging holes 123b, 123' at the above-mentioned position to bias the lens barrel 121b and the arm 121 toward the side of the stoppers 125, 125' for positioning the same. As an end plane 127c of the support stand 127a and an end plane 121j of the bar retaining part 121i are in abutting contact with each other, the support stand 127a defines the position of the lens barrel 121b and the arm 121 at which they are pulled out to their limit. 129 is a lever stopper for preventing rotation of the changeover lever 113 and is also used to prevent the roller 113a from coming into contact with the arm 121, thus giving an unnecessary force to the arm 121 when the roller 113a drops into the wide cam 121f or the tele-cam 121g, wherein the elongated hole 121a has a wider width than the external diameter of the pin 18a. Slanted planes 130, 130' are respectively provided at the edges of the arm 121, wherein the slanted plane 130 is used to prevent the guide roller 124 from coming into contact with the arm 121 when the roller 113a drops into the wide cam 121f, while the slanted plane 130' is used to prevent the guide roller 124 from coming into contact with the arm 121, thus giving an unnecessary force to the arm 121 when the roller 113 drops into the tele-cam 121g.

The operation of the first embodiment of the invention will be described with references to FIGS. 2 through 5.

FIG. 2 and FIG. 4 show operations during the pulling-in process of the lens barrel 121. First, the operation at the time when the lens barrel is stopped will be explained.

The changeover lever 113, when rotating counterclockwise around the shaft 113c, is at a position which serves as a rotation center by the biasing of the spring 116, and, therefore, the roller 113a is dropped into either the tele-cam 121g or the wide cam 121f (the state of FIG. 3 or FIG. 5). At this time, the changeover lever 113 is in contact with the lever stopper 129, but the roller 113a is not touching the arm 121. Also, the plane 130 or 130' is cut on a slant so that the guide roller 124 does not come into contact with the arm 121. At this time, the gear 115 is not meshing with the tele-wide gear 118, but with the gear 119. Also, the switch 114 is in the OFF state.

That is, at the time of film windup, the motor 101 rotates counterclockwise in the normal direction. At this time, the spool clutch 105b and the windup clutch 106b rotate counterclockwise, the spool clutch gear 105 meshes with the spool gear 109, and the windup clutch gear 106 meshes with the sprocket gear 107 for transmitting the power of the motor 101. The spool 110 winds up the film by a gear train 102→103→103a→104→104a→105→109 formed at this time and the sprocket 108 feeds the film by a gear train 102→103→103a→104→104a→106→107. Therefore, the idler gear 111 and the windup clutch gear 106 do not mesh with each other during the film windup time so that the power of the motor 101 is not transmitted to the gears positioned downstream from the idler gear 111 on.

At the time of film rewinding, the motor 101 makes a reverse rotation (a rotation in the clockwise direction) by a switch (not shown) other than the switch 114, and the spool clutch 105b and the windup clutch 106b rotate clockwise, resulting in the discontinued meshing between the spool clutch gear 105 and the spool gear 109.

Also, the windup clutch gear 106 has its meshing with the sprocket gear 107 discontinued and instead meshes with the idler gear 111. The fork 120b rotates clockwise by a gear train 102→103→103a→104→104a→106→111→(112)→(115)→119→120 formed at this time for rewinding the film into the patrone (not shown). Also, while the changeover of both clutches 105b and 106b has not been described, an automatic changeover may be made by the respective friction of both gears 105, 106 and both clutches 105b, 106b through a gear train 102→103→103a→104→104a→105 and 106 which transmits the rotating power of the motor 101.

Next, the shifting operation of the lens barrel will be described (in this case, the pulling-in operation of the lens barrel 121b will be made as shown in FIGS. 2 and 4). When the switch member 113e of the changeover lever 113 is pushed in the direction of the arrow shown in the drawing resisting the force of the spring 116 from the state shown in FIG. 3, for rotating the changeover lever 113 clockwise around the shaft 113c which serves as a rotation center resisting the force of the spring 116, the gear 115 has its meshing with the gear 119 discontinued and instead meshes with the tele-wide gear 118. At the same time, the switch engaging part 113b pushes the switch piece 114a of the switch 114 to the switch piece 114b side, the switch pieces 114a, 114b then come into contact with each other to place the switch 114 in the ON state, whereby the motor 101 starts a reverse rotation in the clockwise direction. Therefore, as has been explained before, the gear train during an ordinary film rewinding process is formed and the reversed rotating force of the motor 101 is transmitted down to the gear 112. But, as the changeover lever 113 has rotated in the clockwise direction, rotation of the gear 115 is transmitted to the tele-wide gear 118, and the rotating pin 118b rotates counterclockwise through the pin supporting part 118a to push the rear wall of the elongated hole 21a as shown in FIG. 2. Therefore, as the lens barrel 121b starts retreating and after the roller 113a comes out of the tele-cam 121g, the arm 121 retreats together with the lens barrel 112b to a position such that the lens barrel 121b rides over the cam 121h, then the changeover lever 113 which has the external force removed by hand, cannot rotate counterclockwise any more in spite of the restoring power of the spring 116, and the state of each mechanism, as is, will be continued (FIG. 2 shows such a state). Then, the rotating pin 118b rotates to a position near the rearmost portion, the lens barrel 121b and the arm 121 come to their positions somewhat before the prescribed pulled-in positions, and each one of the engaging parts 122a, 122'a of the sheet springs 122, 122' starts dropping into and engaging with the sheet spring engaging holes 123b, 123'b of the external tube 123 by the biasing of the springs themselves. Then the lens barrel 121b and the arm 121 will no longer depend on the rotating force of the rotating pin 118b, and the arm 121 is pulled into the prescribed pull-in position restrained by the stoppers 125, 125' under the biasing force at the time of engagement, and is thus biased and retained therein. At this time, the roller 113a drops into the wide cam 121f and the changeover lever 113 is rotated counterclockwise by the action of the spring 116 until it abuts onto the lever stopper 129. The gear 115 is then removed from the tele-wide gear 118 and the switch 114 is placed in the OFF state for stopping rotation of the motor 101, thus retaining the state shown in FIG. 5.

Here, by the above-mentioned action of the sheet springs 122, 122' onto the arm 121, the rotating pin 118b will no longer push the rear wall of the elongated hole 121a and is apparently shifted relative from the rear wall side to the front wall side of the elongated hole 121a and thus is placed at the rearmost position as shown in FIG. 5. Also, at this time, since the guide roller 124 arrives at a position opposing the slanted plane 30' of the arm 121, it is separated from the side plane of the arm 121.

Also, when the arm 121 moves together with the lens barrel 121b, the arm 121 is guided and shifted along in the direction of the optical axis by the bar retaining part 121i which is shifted along the guide bar 126. Further, when the arm 121 is in the course of shifting and while the engaging function of the sheet springs 112, 112' does not affect the arm 121, the guide roller 124 abuts onto the side plane of the arm 121 in a position such that it opposes the position of the arm 121 at which the roller 113a abuts onto the cam 121h, and the arm 121 is sandwiched by the roller 113a and the guide roller 124. Therefore, when an external force works on the lens barrel 121b, there exists a possibility that the roller 113a will strongly abut onto the cam 121h of the arm 121, depending upon the direction of the external force, thus causing eccentricity and an inclination of such an optical system as the photo-taking lens 121c. But, as the guide roller 124 receives the force, such a possibility can be eliminated.

While explanations have been made on the shifting from the pulled-out position (the telephoto-taking position) of the lens barrel 121b to the pulled-in position (the standard photo-taking position), a brief explanation will now be made on an operation reverse thereto.

Under the above-mentioned state shown in FIG. 5, the changeover lever 113 is rotated clockwise to have the roller 113a come out of the wide cam 121f and at the same time the gear 115 is made to mesh with the tele-wide gear 118 for placing the switch 114 in the ON state. As a result of this, the reverse rotating force of the motor 101 in the clockwise direction is transmitted to the rotating pin 118b through the above-mentioned gear train, and the rotating pin 118b pushes the front wall of the elongated hole 121a. Then, the arm 121 together with the lens barrel 121b are pulled out forward and the roller 113a comes out of the wide cam 121f and rides over the cam 121h. This then results in the changeover lever 113 from which the external force of a hand has been removed, no longer being able to rotate in the counterclockwise direction, and the state of each mechanism will be retained as is.

Then, before long, the rotating pin 118b rotates from the rearmost position to a spot near the foremost position, and when the lens barrel 121b and the arm 121 come into position somewhat before the prescribed pulled-out position, each one of the engaging parts 122a, 122'a of the sheet springs 122, 122' starts dropping into the sheet spring engaging holes 123a, 123'a of the external tube 123 by its own biasing force. Then the lens barrel 121b and arm 121 will no longer depend on the rotating force of the rotating pin 118b and will be pulled out by the force of said sheet springs 122, 122' at the time of the engagement to the prescribed pulled-out position at which the end plane 121j of the bar supporting part 121i abuts onto the end plane 127c of the support stand 127a.

At this time, the roller 113a drops into the tele-cam 121g and the changeover lever 113 is rotated counterclockwise until it abuts onto the lever stopper 129, and the gear 115 is separated from the tele-wide gear 118 for placing the switch 114 in the OFF state and stopping the rotation of the motor 101. Thus, the state shown in FIG. 3 will be secured from the state shown in FIG. 4. Then, the rotating pin 118a positioned at the foremost position will no longer push the front wall of the elongated hole 121a by the above-mentioned action of the sheet springs 122, 122' onto the arm 121, and the pin 118a is apparently shifted relative from the front wall side to the rear wall side of the elongated hole 121a and comes to the foremost position as shown in FIG. 3. Also, at this time, the guide roller 124 will not abut onto the arm 121 by the slanted plane 130.

While a description has been provided of the embodiments in which the rotating pin 118b is placed at the foremost or the rearmost position under the prescribed position as shown in FIG. 3 or in FIG. 5, the rotating pin 118b does not have to be located at such position, but may be placed at a position near to the same by providing a wider width for the elongated hole 121a or by varying the amount of shifting of the sheet springs 122, 122'.

Also, the stoppers 125, 125' or the stopper constituted by abutting of the support stand 127a and the bar retaining member 121i in the above embodiment are not necessarily indispensable.

Also, it is preferable that the line connecting the roller 113a and the rotation center of the guide roller 124 crosses perpendicularly the optical axis or the shifting direction of the lens barrel 121b.

Also, the guide roller 124 and the roller 113a may be made of the same components for reducing the amount of types of component parts. Further, when the notches into which the roller 113a escapes and the notched portions which provide a spaced allowing the guide roller 124 to stand without contact with the arm 121 are made to have the same shape and the same relative positions, they come into contact with the lens barrel part simultaneously and come off of the same simultaneously. Thus, there will be no undue force working on the lens barrel part in the lateral direction against the optical axis.

Figure 6:
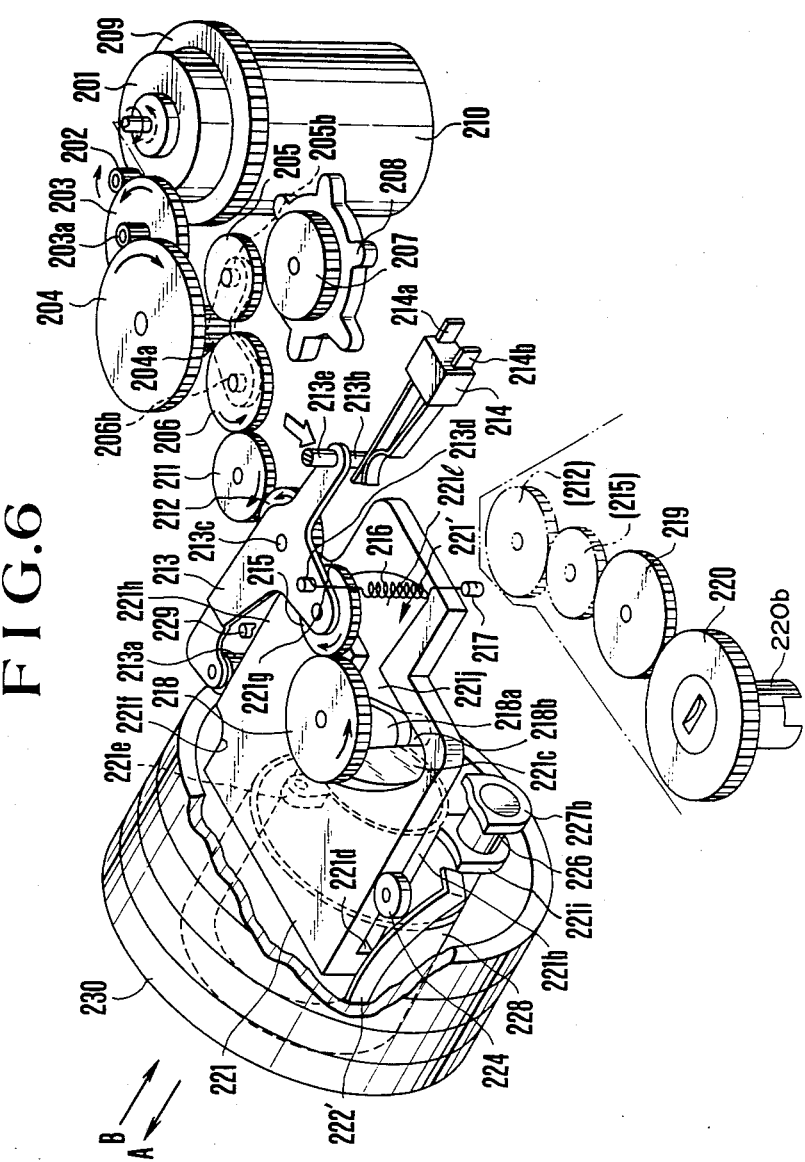
FIG. 6 is an oblique view showing an arrangement of a second embodiment of an optical system shifting device for a camera according to the present invention.

FIG. 6 shows a second embodiment in which the embodiment shown in FIG. 2 is partially improved, wherein 201 is a reversible motor which effects the winding-up and rewinding of film, various charges, such as a shutter charge, and a pulling-out and a pulling-in of the lens barrel. The motor 201 is housed in a spool 210 which rotates at the time of winding-up of the film for taking up the film. A pinion gear 202 is pressure inserted into a shaft of the motor 201, and gears 203, 203a, 204, 204 and 204a form a gear train to reduce the rotational speed of the motor 201, wherein the gears 203 and 203a are provided integrally in a concentric manner as well as the gears 204 and 204a, and the pinion gear 202 and the gear 203 mesh with each other while the gear 203a and the gear 204 mesh withe ach other. 205 is a spool clutch gear for transmitting the rotation of the gear 204a to a spool gear 209 attached to a spool 210 only when the motor 201 rotates in the windup direction (when the motor 201 rotates in the counterclockwise direction as shown by an arrow drawn by a dotted line in the drawing as a normal rotation of the motor). A windup clutch gear 206 rotates together with the rotation of a windup clutch 206b and engages either with a sprocket gear 207 when the rotating direction of the motor 201 is in the windup direction, or with an idler gear 211 when the rotating direction of the motor 201 is in the rewinding direction (when rotation is in the clockwise direction as shown by an arrow drawn by a solid line in the drawing as a reverse rotation of the motor 201), thus transmitting the rotation of the gear 204a. 208 is a sprocket, and a prescribed length of film corresponding to one frame is forwarded by the rotation of a sprocket gear 207.

Also, when the spool clutch gear 205 and the windup clutch gear 206 are always meshing with the gear 204a, rotation shafts are provided for the spool clutch 205b and the windup clutch 206b respectively so that they can rotate independently. Also, friction is provided between both clutches 205b, 206b and both gears 205, 206, respectively, for effectng a changeover of the clutches.

A changeover lever 213 is rotatably provided in a concentric manner with the shaft 213c of a gear 212 and is biased counterclockwise by a spring 216 spanned between a pin 213d planted thereon and a pin 217 provided on the camera body, wherein one gear 215 out of a gear train 211→212→215→219→220, which is normally connected down to a fork 220b, is separated from the gear train and is made to mesh with a tele-wide gear 218 for transmitting the rotation of the motor 201 to the tele-wide gear 218 by manually rotating the changeover lever 213 in the clockwise direction resisting the biasing by the spring 216, as will be described below. Also, the changeover lever 213 is formed generally in a T-shape and at its central portion axially supports a gear 212 meshing with an idler gear 211, and, even further, axially supports at one of its ends a gear 215 which meshes with the gear 212. A switch engaging part 213b and a switch member 213e, which acts as operating means for manually changing over a clutch composed of the changeover lever 213, etc., are provided at another end of the lever 213, and further, a roller 213a is provided a still another end of the same. A tele-wide gear 218 changes its rotation through a pin supporting part 218a into the rotation of a rotating pin 281b, and the rotating pin 218b pushes on the wall of a double sector hole 221' in an arm 221, wherein said hole 221' is formed of two sector holes which have a common center and are symmetrical to each other, thus moving the arm 221 forward and rearward against the camera. Further, a lens barrel supporting part 221e of a lens barrel 221b is attached to a lens barrel attaching part 221d of the arm 221, and the lens barrel 221b which holds a photo-taking lens 221c is shifted forward or rearward together with the arm 221. Also, at the front part of the arm 221, a lens barrel cover 228 which has sheet springs 222, 222' provided at its sides for the purpose of positioning, as will be described below, is attached. And further, a shiftable external tube 230 is provided which is combined at the front end portion of the lens barrel cover 228 and covers the circumference of the lens cover 228 and the circumference of the front portion of the arm 221. When a force is placed directly on a part of the lens barrel, as will be described later, or, the switch member 213e is put into operation for the purpose of rotating the changeover lever 213 clockwise until the gear 215 meshes with the tele-wide gear 218, the switch engaging part 213b places the switch 214 in the ON state, but places the switch 214 in the OFF state at a time other than during the meshing of the gears 215 and 218. Also, the switch 214 has a switch piece 214a and a switch piece 214b, and is placed in the ON state as these pieces 214a and 214b come into contact with each other for supplying power to the motor 201, thus rotating the same in the reverse direction (clockwise rotation) for shifting the lens barrel 221b. When the above-mentioned shiftable external tube 230, which protrudes through to the outside of the camera, thus allowing for the manual handling thereof, is shifted slightly together with the lens barrel 221b which is in the photo-taking position, the arm 221 is shifted in the direction of the optical axis thereof. This shifting occurs by manually placing a force on the tube 230 in the direction of arrow A which is in the direction of the optical axis of the photo-taking lens 221c or in the direction of the arrow B, or when the switch member 213e is shifted as a result of placing a force on the same, in the direction of the arrow shown in the drawing, the roller 213a rotates clockwise around the rotation shaft of the changeover lever 213 which serves as a center of rotation and is shifted, thus coming out of either the wide cam 221f or the tele-cam 221g which act as associating means and are provided at two corners of the arm 221 in a notched shape and ride over a cam 221h of the arm 221 provided in a direction parallel to the optical axis of the photo-taking lens 221, thus preventing the changeover lever 213 from returning by a counterclockwise rotation and, at the same time, retaining the changeover lever 213 in the above-mentioned state so that shifting of the arm 221 to the forward or rearward direction will not be hindered. The spring 216 is used to rotate the changeover lever 213 counterclockwise when the lens barrel 221b reaches its pulled-out (or pulled-in) position which constitutes the photo-taking position, for the purpose of quickly dropping the roller 213a into the tele-cam 221g (or the wide cam 221f). The gear 215 is then separated from the tele-wide gear 218 by the above-mentioned dropping and, at the same time, the switch 214 is placed in the OFF state.

There is also an arrangement such that the counterclockwise rotation of the motor 201 as a reverse rotation thereof is transmitted to a fork 220b through a gear train 211→212→215 219→220 which is always in a meshed state unless the lens barrel 221b is pulled-out or pulled in. Therefore, the gear train rotates as a result of the reverse rotation of the motor 201 at the time of film rewinding, and thus, the fork 220b provided at the gear 220 rotates so that the exposed film will be taken up from the spool 210 into a patrone (not shown). Also, concerning the other members not explained with reference to FIG. 6, explanations will be made with reference to FIGS. 7 through 9.

Figure 9:
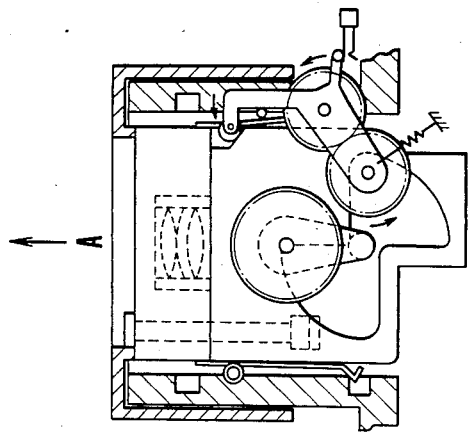
FIG. 9 is a partially cut view as seen from above of the device shown in FIG. 6 in a state in which the lens barrel is set at the standard photo-taking side.
Figure 8:
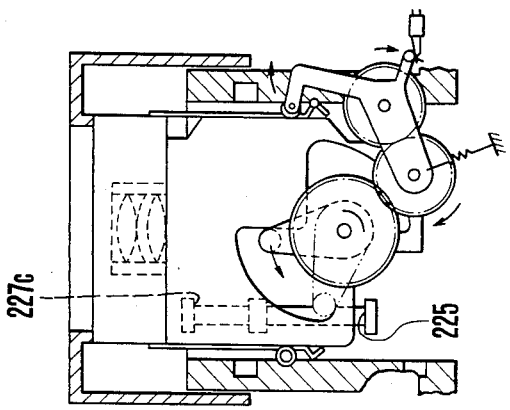
FIG. 8 is a partially cut view as seen from above of the device shown in FIG. 6 as in a state in which the lens barrel is set at the standard photo-taking side.
Figure 7:
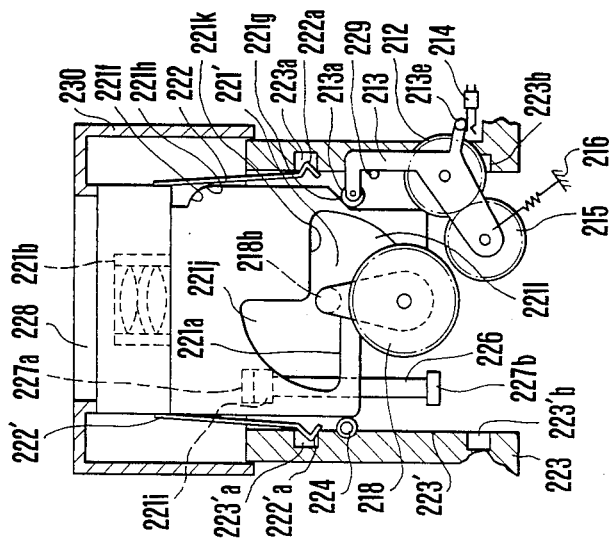
FIG. 7 is a partially cut view as seen from above of the device shown in FIG. 6 in a state in which a lens barrel is set at the telephoto side.

FIGS. 7 through 9 are partially cut views of the lens barrel part shown in FIG. 6, as seen from above, wherein FIG. 7 shows the lens set at the telephoto position, and FIG. 8 shows the lens barrel being pulled-in to the standard photo-taking side, while FIG. 9 shows the photo-taking lens set at the standard photo-taking position. Also, concerning elements with the same identification numerals as in FIG. 6, since explanations have already been made, a repetition thereof is unnecessary.

In these drawings, an external tube 223 fixed to a camera body not shown in FIG. 6, has sheet spring engaging holes 223a, 223'a as well as 223b, 223'b provided, respectively, at corresponding fixed positions for a standard photo-taking and a telephototaking of the lens barrel 221b, so that sheet springs 222, 222' to be described later enter thereinto for fixing the lens barrel 221b, wherein the diameter of the holes are smaller than that of the shiftable external tube 230 and larger than those of the lens barrel cover 228 and the arm 221. Sheet springs 222, 222' are attached to exterior sides of the lens barrel cover 228 provided at the front part of the arm 221 in a symmetrical manner in relation to the center axis of the cover 228.

Further, the springs 222, 222' are biased so as to expand in the direction of the diameter of the external tube 233, wherein the engaging parts 222a, 222'a at the fore end portions thereof are formed generally in V-shape, and pull out the arm 221 together with the lens barrel 221b to their respectively prescribed positions or push in the arm 221 together with the lens barrel 221b to their respectively prescribed positions. When these engaging parts 222a, 222'a engage with the sheet spring engaging holes 223a, 223'a or 223b, 223'b of the external tube 223, the arm 221 is thus biased to the stopper side to be described below. The shifting by the sheet springs 222, 222' at this time is made independent of the force of the rotating pin 218b. A pin or smoothly rotating guide roller 224 is placed at a position which opposes the roller 213a sandwiching the arm 221 therebetween and has its external circumference formed into a sliding plane.

The pin or roller 224 comes into contact with a side plane of the arm 121 for preventing unnecessary movement of the arm 221 in the direction perpendicular to the shifting direction thereof without hindering the shifting of the lens barrel 221b in the axial direction. A guide bar 226 has both of its ends supported by support stands 227a, 227b provided at the camera body, and has its shaft provided in the direction of the optical axis which is the shifting direction of the arm 121 having a smooth external circumference, and a circular bar retaining part 221i which is fixed to the arm 221 has the bar 226 inserted thereinto freely slidable in the axial direction. The bar retaining part 221i and a stopper 227c or 225 which abuts the support stand 227a or 227b have the role of a stopper for defining the positions of the lens barrel 221b and the arm 221 by a bias through the engagement of the sheet springs 222, 222' when the lens barrel 221b and the arm 221 are pulled out or pulled in to their limits. The above-described double sector hole 221' consists of a first sector hole 221j and a second sector hole 221l. 221a is a side wall of the first sector hole 221j, and 221k is a side wall of the second sector hole 221l, wherein the first sector hole 221j is located in front of the second sector hole 221l and the side wall 221a and the side wall 221k are parallel to each other. The rotating pin 218b at its foremost position is located at the side wall 221a side of the combined parts of both sector holes 221j, 221l, and designates the second telephoto-taking position. The pin 218b at its rearmost position is located at the side wall 221k of the combined part of both sector holes 221j, 221l, and designates the standard photo-taking position as shown in FIG. 9. Also, the boundaries of the combined parts have somewhat of a curvature, and the central axes in the longitudinal directions of the side walls 221a and 221k should preferably be parallel to each other and perpendicular to the axis of the guide bar 226. Further, the distance of separation between their extended lines is somewhat larger than the diameter of the rotating pin 218b. A lever stopper 229 prevents rotation of the lever 213. When roller 213a drops into the wide cam 221f or the tele-cam 221g, the roller 213a is prevented from strongly abutting onto the arm 221 thus giving an unnecessary force in the direction perpendicular to the optical axis.

The operation of this embodiment will be described with reference to FIGS. 6 through 9. FIGS. 6 and 8 show operations for the pulling-in process of the lens barrel 221b. First, the operation at a time when the lens barrel is stopped will be explained.

The changeover lever 213 is at a position as it rotates counterclockwise around the shaft 213c, which serves as the center of rotation due to the biasing of the spring 216, and, therefore, the roller 213a is dropped into either the tele-cam 221g or the wide cam 221f (the state of FIGS. 7 or 9). At this time, the gear 215 is not meshing with the tele-wide 218, but is instead meshing with the gear 219. Also, the switch 214 is in the OFF state.

That is, at the time of film windup, the motor 201 rotates in its normal direction (counterclockwise rotation), the spool clutch 205b and the windup clutch 206b rotate counterclockwise, the spool clutch gear 205 meshes with the spool gear 209, and the windup clutch gear 206 meshes with the sprocket gear 207 for transmitting the power of the motor 201. The spool 210 winds up the film by a gear train 202→203→203a→204→204a→(205)→209 formed at this time and the sprocket 208 feeds the film by a gear train 202→203→203a→204→204a→(206)→207. Therefore, the idler gear 211 and the windup clutch gear 206 do not mesh with each other during this time of film windup, and, therefore, the power of the motor 201 is not transmitted to the gears at the lower positions from the idler gear 211 on.

At the time of film rewinding, the motor 201 makes a reverse rotation (a rotation in the clockwise direction) by a switch (not shown) other than the switch 214, and the spool clutch 205b and the windup clutch 206b rotate clockwise. Because of this, the meshing between the spool clutch gear 205 and the spool gear 209 is discontinued, and also, the windup clutch gear 206 has its meshig with the sprocket gear 207 discontinued and instead meshes with the idler gear 211. The fork 220b rotates clockwise by a gear train 202→203→203a→204→204a→206→211→(212)→(215)→219→220 formed at this time, for rewinding the film into the patrone (not shown). Also, while the changeover of both clutches 205b and 206b has not explained, an automatic changeover may be made by the respective friction of both gears 205, 206 and both clutches 205b, 206b through a gear train 202→203→203a→204→204a→205 and 206 which transmits the rotating power of the motor 201. At the time when the lens barrel is pulled-out or pulled-in, the gear train at the time of film rewinding will be formed by an action similar to that as mentioned above by the reverse rotation of the motor 201 as far as the gear train 202→203→203a→204→204a→206→211→212, but the gear 215 meshes with the tele-wide gear 218 by a changeover of a clutch composed of the changeover lever 213, etc., therefore, a gear train 202→203→203a→204→204a→206→211→212→215→218 is formed, and the force of the reverse rotation of the motor 201 is transmitted down to the rotating pin 218 by the same.

The operation when the lens barrel is shifted will be explained with reference to pull-in operation of the lens barrel as shown in FIG. 6 and FIG. 8. If the force when the external tube 230 is pushed by hand in the direction of arrow B shown in the drawing from the state as shown in FIG. 7 is weak, and the sheet spring engaging parts 222a, 222'a cannot go over the sheet spring engaging holes 223a, 223'a, the original state as shown in FIG. 7 will be resumed after the external force is removed due to the restoring force of the sheet springs 222, 222'. But, if the push-in force (or a force derived from an external shock working on the lens barrel part) is strong and the sheet spring engaging parts 222a, 222'a go over the sheet spring engaging holes 223a, 223'a and touch the inner plane wall part 223' of the external tube 223, the whole lens barrel including the arm 221, the lens barrel 221b, the lens barrel cover 228, the photo-taking lens 221c, the shifting external tube 230, and the bar retaining part 221i, is pushed in along the guide bar 226 in the pulled-in direction as shown by the arrow B in the drawing. In this case, the rotating pin 218b comes into contact with a side wall of the first sector hole 221j other than the side wall 221a, is guided thereby, and then escapes into the first sector hole 221j side. And, at the same time, the tele-cam 221g, which has been designated so that the roller 213a cannot easily go over the same, retreats, thereby pushing up the roller 213a to the cam 221h side. Then, the changeover lever 213 rotates clockwise around the shaft 213c which serves as a center of rotation, and results in a separation of the gear 215 from the gear 119 in the above-mentioned film rewinding gear train and is made to mesh with the tele-wide gear 218. At the same time, the switch engaging part 213b pushes the switch piece 214a to the switch piece 214b, then the switch pieces 214a, 214b are made to come into contact with each other thus placing the switch 214 in the ON state. As a result, the motor 201 starts a reverse rotation in the clockwise direction. Therefore, the force of the motor 201 is transmitted to the tele-wide gear 218 through the gear 212 and the gear 215, and then the rotating pin 218b rotates counterclockwise through the pin supporting part 218a. And the rotating pin 218b abuts the side wall 221a due to rotation of the rotating pin 218b within the first sector hole 221j, and then rotates farther to push the side wall 221a rearwards for pulling in the arm 221 and the lens barrel 221b along the guide bar 226 to the pull-in direction as shown by arrow B in the drawing (the state shown in FIG. 6 or FIG. 8). This state will be continued since the roller 213a rides on the cam 221h. And before long, when the rotating pin 218b reaches a place near the rearmost position, the roller 213a begins to drop into the wide cam 221f and is dropped thereinto until the changeover lever 213 has its movement prevented by the lever stopper 229. During the process, as the changeover lever 213 rotates counterclockwise by the biasing of the spring 216, the gear 215 has its meshing with the tele-wide gear 218 discontinued and the switch engaging part 213b will not push the switch piece 214a, and thus, the switch 214 is placed in the OFF state and the rotating pin 218b is placed at is rearmost position. Along with this operation, the sheet spring engaging parts 222a, 222'a of the sheet springs 222,222' respectively drop into the sheet spring engaging holes 223b, 223'b, and the lens barrel parts such as the arm 221, etc. are, by the biasing thereof, pulled from a position just before the prescribed position toward the rear independent of the rotating force of the rotating pin 218b. Then the bar retaining part 221i abuts the stopper part 225 provided at the camera body, and thus, the positioning is achieved (in this case, the rotating pin 218b will not exert its force to any of the parts).

Next, the operation of the lens barrel going from a pulled-in state as seen in FIG. 9 to a pulled-out state as seen in FIG. 7 will be briefly explained.

When the shiftable external tube 230 at the state shown in FIG. 9 is pulled manually in the direction of arrow A, shown in the drawing, the sheet springs 222, 222' come out of the sheet spring engaging holes 223b, 223b', and the entire lens barrel part is pulled out in the pullout direction as shown by arrow A. At this time, the rotating pin 218b comes into contact with a side wall of the second sector hole 221l at a side which is different from the side wall 221k and is guided thereby, thus escaping into the second sector hole 221l, while the wide cam 221f proceeds simultaneously and the roller 213a is thereby pushed up to the cam 221h. Then, the changeover lever 213 rotates clockwise and the gear 215 meshes with the tele-wide gear 218, the switch 214 is then placed in the ON state, and thus, the motor 201 makes a reverse rotation in the clockwise direction. As a result of this, the rotating pin 218b pushes the side wall 221k forward, and therefore, the lens barrel parts, such as the arm 221 and the lens barrel 221b, etc., are pulled out toward the direction of arrow A, as shown in the drawing, along the guide bar 226. Then, as the rotating pin 218b reaches a place near the foremost position, the roller 213a begins dropping into the tele-cam 221g and drops thereinto until the movement of the changeover lever 213 is prevented by the lever stopper 229. During this process, the rotating pin 218b is located at the foremost position and the meshing between the gear 215 and the tele-wide gear 218 is discontinued, while the switch 214 is placed in the OFF state, and thus, the reverse rotation of the motor 201 is stopped. At the same time, the sheet spring engaging parts 222a, 222'a of the sheet springs 222, 222' respectively drop into engaging holes 223a, 223'a from the above-mentioned position, just before the prescribed position of the lens barrel part. Then the lens barrel part is pushed forward by the biasing force thereof, independent of the rotating force of the rotating pin 218b, and the fore end of the bar retaining part 221i then abuts onto the stopper part 227c of the support stand 227a. Thus, positioning of the abovementioned lens barrel part will be achieved (in this case, the rotating pin 218b will not exert its force onto any other parts).

Next, explanations will be given with reference to the operation of the pulling-out and pulling-in of the lens barrel part by handling of the switch member 213e.

A force is placed on the switch member 213e at a state as shown in FIG. 7 (or FIG. 9) for rotating the changeover lever 213 clockwise, resisting the force of the spring 216, and thus, placing the switch 214 in the ON state and having the gear 215 and the tele-wide gear 218 mesh with each other. This then results in the reversed rotating force of the motor 201 being transmitted to the rotating pin 218b through the above-mentioned gear train. By this counterclockwise rotation of the rotating pin 218b, this pin 218b pushes against the side wall 221a (or the side wall 221k) for the purpose of pulling in the lens barrel part (or pulling out the same). Therefore, the roller 213a is separated from the tele-cam 221g (or the wide cam 221f) and rides over the cam 221h, and thus, this state will be maintained. Since the operation thereafter will be exactly the same as the operation mentioned above for operation of the shiftable external tube 230, for the pulling-out or the pulling-in of the lens barrel part, explanations thereof will be omitted.

Figure 10A:
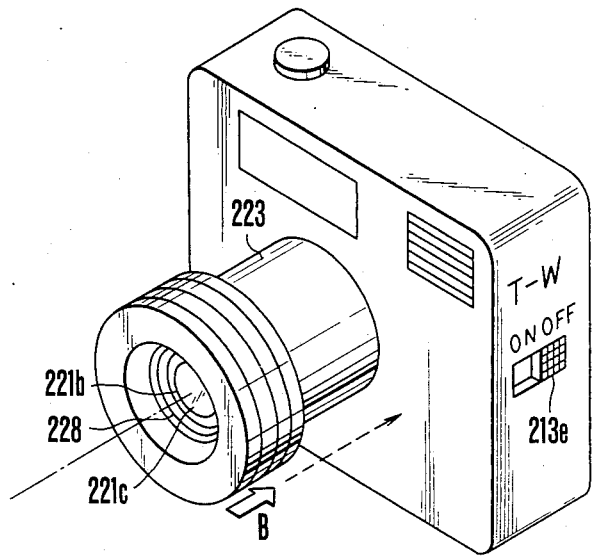
Figure 10B:
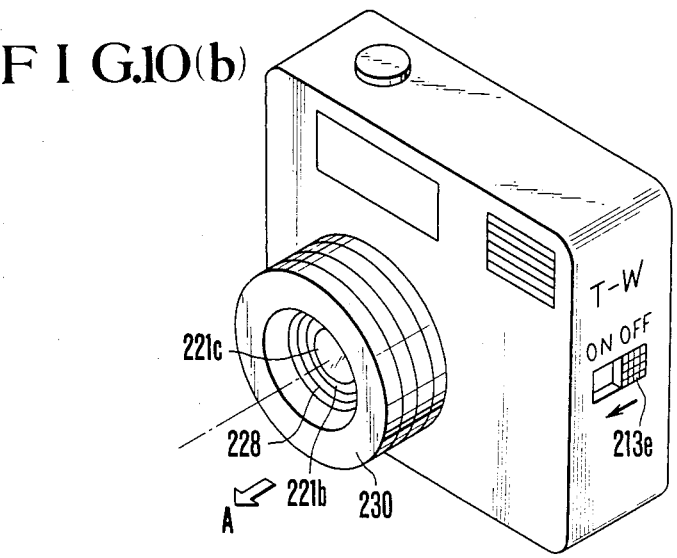

FIG. 10(a) shows an external view of a camera in which a photo-taking lens is set at the telephoto position and FIG. 10(a) shows an external view of a camera in which a photo-taking lens is set at the standard photo-taking position. Also, the switch member 213e is exposed to the outside through an elongated opening at the left side of the camera body, the shiftable external tube 230 is also exposed to the outside, and therefore, such manual handling as mentioned above can be achieved. When the shifting external tube 230 or the switch member 213e is shifted somewhat by hand in the direction of the arrow shown in the drawing, a changeover of the focal distance as mentioned above can also be achieved.

Also, since the switch member 213e at the camera body is made to protrude in the vicinity of a position on the camera body where a hand is placed for a photo-taking operation, driving of the lens barrel can be made directly by sliding the same. That is, the switch member 213e is provided at a position at which it can be easily finger-operated etc. without taking one's eye off of the viewfinder during the time of a normal photo-taking operation, and it is used selectively with the shifting lens barrel 30.

While the sheet springs 222, 222' are provided at the lens barrel cover 228 at the fore end of the lens barrel part in the above embodiment, these sheet springs may be provided at any desired portion of the lens barrel part.

Further, while the first and second embodiments shown above are for varying the focal distance in an optical system shifting device of a camera, the present invention is not limited thereto, and instead, the present invention can naturally be applied to any type of equipment in which an optical system is to be shifted as, for example, a camera of the collapsible mount type in which a photo-taking lens can be housed within a camera body.

As has been explained above, according to the present invention, the functional features and maneuverability in an optical system shifting device for a camera in which the optical system is shifted in the direction of the optical axis by a driving force of a motor can be greatly improved.

Especially since the positioning of the lens barrel will be made independently of the driving force of the motor, changeover of the clutch mechanisms, the timing for turning the motor ON and OFF do not have to be precisely controlled and the dimensional accuracy of such component parts does not have to be very high. Therefore, an operation at the time of motor actuation can be made smoothly and, at the same time, a design for the necessary mechanisms can be made easily. Further, the need for a high level of dimensional precision is eliminated, and thus, the manufacting costs of component parts can be held down to a minimum. Also, since positioning of the lens barrel can be made independently of the rotating force of the motor, etc., the positioning accuracy of the lens barrel itself can be enhanced.

Also, since opposing members are provided at a position on the shifting member which move together with the optical system, as opposed to the position on which a retaining clutch for the shifting member abuts, eccentricity and inclination of the optical system can be prevented.

Also, pulling out of the lens barrel part is done automatically by pushing it slightly forward, whereby actuation is made at the time of expansion by slightly pulling the len barrel part toward the operator.

Also, with this arrangement, even when shock by an inadvertent external force works on the lens barrel part at the time when the lens barrel part is stopped at its expanded position, the lens barrel part can be automatically pulled in to a position which can tolerate this external pressure. Therefore, damage to the device can be prevented, thus making it quite advantageous. Further, since an arrangement is provided such that an actuation of the motor can be made at parts other than the lens barrel part, the pulling out and pulling in of the lens barrel can be achieved simply regardless of the photo-taking posture or position that is taken by the operator, and thus, maneuverability is greatly enhanced.

While specific embodiments of the invention have been shown and described in detail to illustrate the application of the inventive principles, it will be understood that the invention may be embodied otherwise without departing from such principles.

We claim:

1. An optical system shifting device for shifting an optical system, comprising:
   (A) driving means for shifting said optical system; and
   (B) positioning means for shifting and positioning said optical system to a prescribed position independent of the driving force of said driving means when said optical system comes to a predetermined position, said positioning means including stopping means for stopping said optical system at said prescribed position.

2. A device according to claim 1, further comprising cut-off means for preventing the driving force from the driving means from being transmitted to the optical system when the optical system reaches the predetermined position.

3. An optical system shifting device for shifting an optical system, comprising:
   (a) driving means for shifting said optical system;
   (b) control means for placing said driving means in an operable state when said control means is shifted in a predetermined direction that is different from the shifting direction of said optical system;
   (c) retaining means, shifting integrally with said optical system, for retaining said control means in the state in which it is when it has been shifted in said predetermined direction; and
   (d) positioning means for effecting positioning of said control means in a direction which is different from the shifting direction of said optical system;
   wherein said positioning means absorbs the force exercised by said control means over said retaining means.

4. A device according to claim 3, wherein said driving means includes a motor.

5. A device according to claim 4, wherein said driving means includes transmitting means for transmitting the driving force of said motor to said optical system.

6. A device according to claim 5, wherein said transmitting means includes a gear.

7. A device according to claim 5, wherein said control means includes associating means for actuating said transmitting means by said control means being shifted in said predetermined direction.

8. A device according to claim 4, wherein said control means includes switching means for initiating power supply to said motor by said control means being shifted in said predetermined direction.

9. A device according to claim 3, wherein said control means includes actuating means for shifting said control means in a direction reverse to the shifting of said control means in said predetermined direction.

10. A device according to claim 9, wherein said actuating means includes an elastic member.

11. A device according to claim 3, wherein said positioning means exercises its function relative to said retaining means at a position such that it opposes the position where said control means is retained by said retaining means.

12. A device according to claim 3, wherein at least one of said control means and said positioning means includes a roller engaging with said retaining means.

13. A device according to claim 3, wherein said control means and said positioning means respectively include rollers which have the same diameter and engage with said retaining means.

14. A device according to claim 3, further comprising:
   (e) second positioning means for shifting and positioning said optical system to a prescribed position when said optical system comes to a predetermined positon independent of the driving force from said driving means.

15. A device according to claim 14, further comprising: engagement preventing means for preventing at least one of said control means and said positioning means for engaging with said retaining means when said second positioning means performs its function.

16. A device according to claim 15, wherein said engagement preventing means includes a notch provided at said retaining means.

17. A device according to claim 15, wherein said engagement preventing means includes shifting prevention means for preventing the shifting of said control means in a direction reverse to the shifting to said predetermined position.

18. A device according to claim 3, wherein said driving means is arranged to change the focal length of the optical system by shifting the optical system.

19. An optical system shifting device for shifting an optical system, comprising:
   (A) driving means for shifting said optical system;
   (B) transmission means for transmitting driving force of said driving means to said optical system;
   (C) actuating means for actuating said driving means;
   (D) associating means for placing said actuating means in an operating state by moving said optical system manually in its shifting direction; and
   (E) guide means for displacing said transmission means in a direction in which the driving force of said driving means is added in response to the manual movement of said optical system in its shifting direction.

20. A device according to claim 19, wherein said driving means includes a motor.

21. A device according to claim 19, further comprising operating means for placing said actuating means in an operating state through a different operation than that of the moving of said optical system.

22. A device according to claim 21, wherein said operating means includes an operating member which can be manually operated.

23. A device according to claim 19, wherein said driving means is arranged to change the focal length of said optical system by shifting said optical system.

24. An optical system shifting device for shifting an optical system, comprising:
   (A) driving means for shifting said optical system;

(B) transmission means for transmitting driving force of said driving means to said optical system;
(C) actuating means for actuating said driving means;
(D) associating means for bringing said actuating means into operating state when said optical system is given a force from exterior in its shifting direction; and
(E) guide means for causing said transmission means to transmit the driving force of said driving means to said optical system in such a manner that said optical system is shifted in the direction in which the exterior force is given when said optical system is given the exterior force.

25. A device according to claim 24, wherein said driving means includes a motor.

26. A device according to claim 24, further comprising operating means for placing said actuating means in an operating state through a different operation than that of the moving of said optical system.

27. A device according to claim 26, wherein said operating means includes an operating member which can be manually operated.

28. A device according to claim 24, wherein said driving means is arranged to change the focal length of said optical system by shifting said optical system.

29. An optical system shifting device for shifting an optical system, comprising:
(A) driving means for shifting said optical system; and
(B) positioning means for shifting and positioning said optical system to a prescribed position independent of the driving force of said driving means when said optical system comes to a predetermined position.

30. An optical system shifting device according to claim 29, comprising:
wherein said positioning means includes elastic means for biasing said optical system towards said prescribed position.

31. A device according to claim 30, wherein said driving means includes a motor.

32. A device according to claim 30, wherein said positioning means includes engaging means for shifting said optical system to said prescribed position by engaging with said elastic means.

33. A device according to claim 30, wherein said driving means is arranged to change the focal length of the optical system by shifting the optical system.

34. A device according to claim 30, further comprising cut-off means for preventing the driving force from the driving means from being transmitted to the optical system when the optical system reaches the predetermined position.

35. An optical system shifting device for shifting an optical system, comprising:
(A) driving means for shifting said optical system;
(B) actuating means for actuating said driving means; and
(C) associating means for placing said actuating means in an operating state by moving said optical system in its shifting direction.

36. An optical system shifting device according to claim 35, further comprising:
(D) operating means for placing said actuating means in an operating state through a different operation than that of the moving of said optical system.

37. A device according to claim 36, wherein said driving means includes a motor.

38. A device according to claim 36, wherein said operating means included an operating member which can be manually operated.

39. A device according to claim 36, wherein said driving means is arranged to change the focal length of the optical system by shifting the optical system.

40. A camera having an optical system, comprising:
(A) driving means for shifting said optical system; and
(B) positioning means for shifting and positioning said optical system to a prescribed position independent of the driving force of said driving means when said optical system comes to a predetermined position, said positioning means including stopping means for stopping said optical system at said prescribed position.

41. A camera having an optical system, comprising:
(a) driving means for shifting said optical system;
(b) control means for placing said driving means in an operable state when said control means is shifted in a predetermined direction that is different from the shifting direction of said optical system;
(c) retaining means, shifting integrally with said optical system, for retaining said control means in the state in which it is when it has been shifted in said predetermined direction; and
(d) positioning means for effecting positioning of said control means in a direction which is different from the shifting direction of said optical system;
wherein said positioning means absorbs the force exercised by said control means over said retaining means.

42. A camera having an optical system, comprising:
(A) driving means for shifting said optical system;
(B) transmission means for transmission driving force of said driving means to said optical system;
(C) actuating means for actuating said driving means;
(D) associating means for placing said actuating means in an operating state by moving said optical system manually in its shifting direction; and
(E) guide means for displacing said transmission means in a direction in which the driving force of said driving means is added in response to the manual movement of said optical system in its shifting direction.

43. A camera having an optical system, comprising:
(A) driving means for shifting said optical system;
(B) transmission means for transmitting driving force of said driving means to said optical system;
(C) actuating means for actuating said driving means;
(D) associating means for bringing said actuating means into operating state when said optical system is given a force from exterior in its shifting direction; and
(E) guide means for causing said transmission means to transmit the driving force of said driving means to said optical system in such a manner that said optical system is shifted in the direction in which the exterior force is given when said optical system is given the exterior force.

44. A camera having an optical system, comprising:
(A) driving means for shifting said optical system; and
(B) positioning means for shifting and positioning said optical system to a prescribed position independent of the driving force of said driving means when said optical system comes to a predetermined position.

45. A camera having an optical system, comprising:
(A) driving means for shiftting said optical system;
(B) actuating means for actuating said driving means; and
(C) associating means for placing said actuating means in an operating state by moving said optical system in its shifting direction.

* * * * *